(12) United States Patent
Zirk et al.

(10) Patent No.: US 7,036,952 B2
(45) Date of Patent: May 2, 2006

(54) SINGLE BODY MULTI-TOOL DEVICE

(76) Inventors: Jason E. Zirk, 344 Gravels Rd., Harrisonburg, VA (US) 22802; Darren Kady, 3900 Springfield Rd., Glen Allen, VA (US) 23060

( * ) Notice: Subject to any disclaimer, the term of this patent is extended or adjusted under 35 U.S.C. 154(b) by 105 days.

(21) Appl. No.: 10/790,752

(22) Filed: Mar. 3, 2004

(65) Prior Publication Data

US 2004/0174700 A1    Sep. 9, 2004

Related U.S. Application Data

(60) Provisional application No. 60/451,544, filed on Mar. 3, 2003.

(51) Int. Cl.
*B25B 23/18* (2006.01)
*B26B 11/00* (2006.01)
*B26B 23/00* (2006.01)

(52) U.S. Cl. .................. 362/119; 362/120; 7/118; 7/145; 7/159; 30/308.1; 30/308.2

(58) Field of Classification Search .......... 362/109, 362/119–120; 7/118–120, 145, 159, 168, 7/114–116, 122, 170; 30/308.1, 308.2, 153
See application file for complete search history.

(56) References Cited

U.S. PATENT DOCUMENTS

| | | | | |
|---|---|---|---|---|
| 1,596,602 A * | 8/1926 | Eagan et al. | ............ | 7/145 |
| 1,899,868 A * | 2/1933 | Herlbauer | ............ | 362/199 |
| 3,837,023 A * | 9/1974 | Spencer-Foote | ............ | 7/145 |
| 4,023,221 A | 5/1977 | Cadman | | |
| 4,700,420 A | 10/1987 | Belanger | | |
| 4,805,303 A * | 2/1989 | Gibbs | ............ | 30/161 |
| 5,103,520 A * | 4/1992 | Mazzo | ............ | 7/104 |
| 5,297,306 A * | 3/1994 | Shandel | ............ | 7/114 |
| 5,771,588 A * | 6/1998 | Petrich | ............ | 30/308.2 |
| 6,273,582 B1 * | 8/2001 | Taggart et al. | ............ | 362/119 |
| 6,357,067 B1 | 3/2002 | Jones | | |
| 6,412,130 B1 * | 7/2002 | Kershaw et al. | ............ | 7/129 |
| 6,454,430 B1 * | 9/2002 | Lin | ............ | 362/119 |
| 2004/0016058 A1 * | 1/2004 | Gardiner et al. | ............ | 7/119 |

* cited by examiner

*Primary Examiner*—Renee Luebke
*Assistant Examiner*—David Makiya
(74) *Attorney, Agent, or Firm*—Robert E. Bushnell, Esq.

(57) ABSTRACT

A single body multi-tool device having a plurality of compartments in a housing thereof. Mounted in these compartments are various hand tools such as a hatchet, a digging tool, a flashlight, a knife and a saw, each being separately usable without interfering with the operation and/or use of another of the tools. This multi-tool device is generally concerned with the field of hand tools, and is specifically concerned with hand tools used in the outdoors, such as while camping.

31 Claims, 12 Drawing Sheets

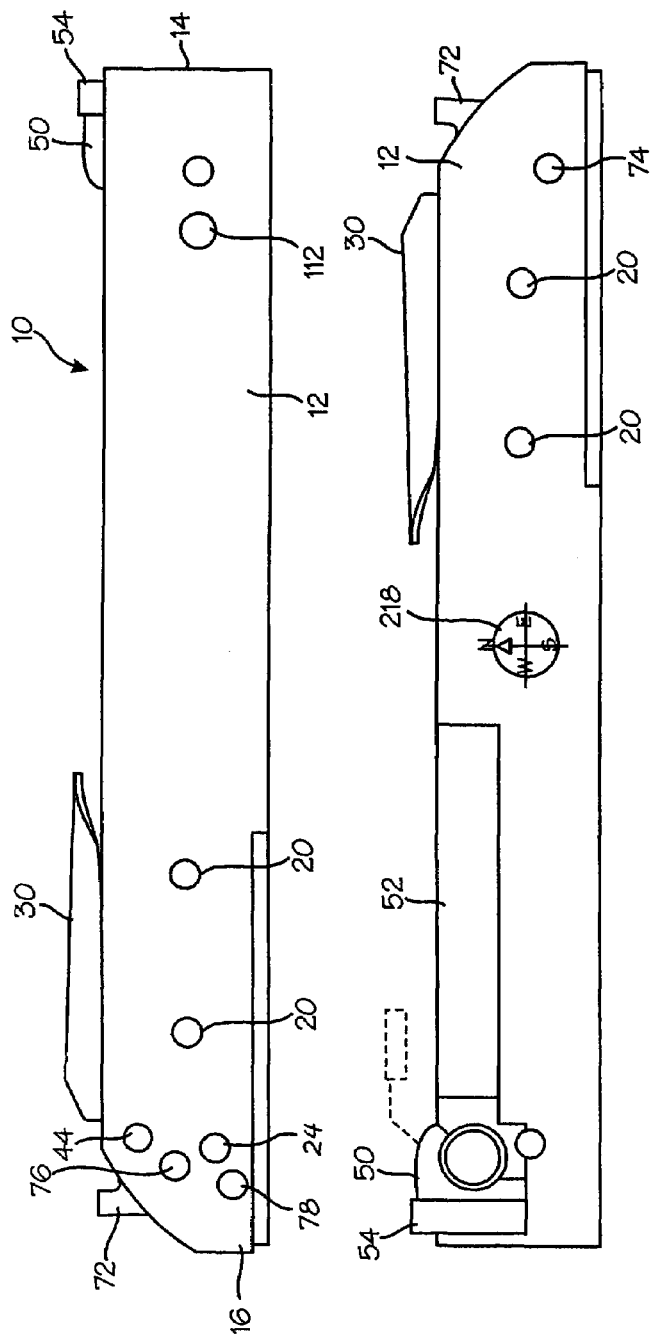
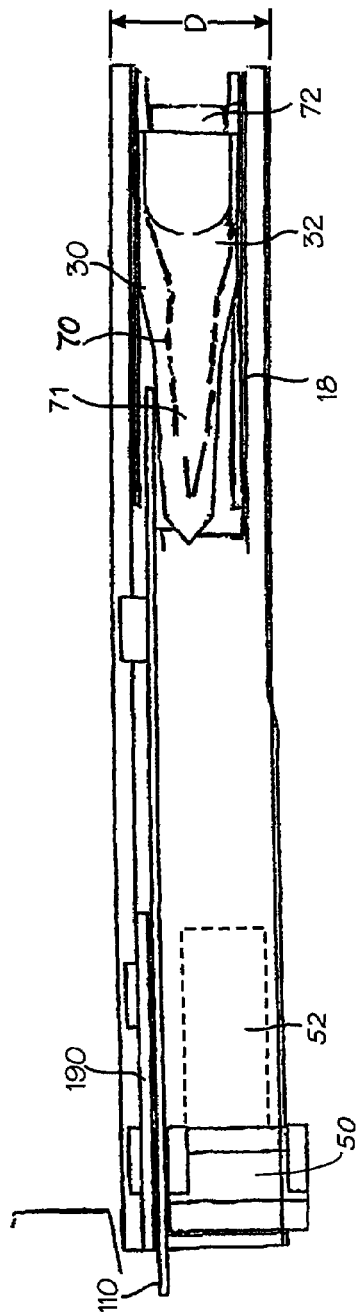
Fig. 1
Fig. 2
Fig. 3

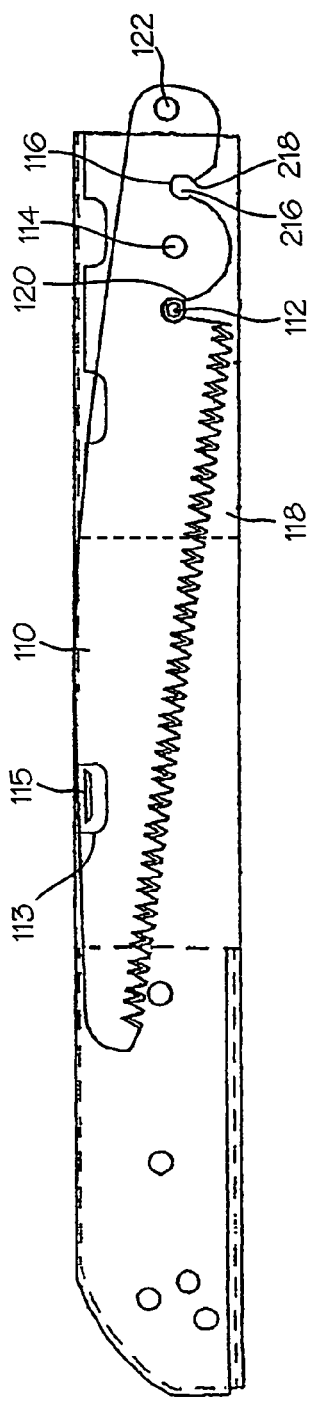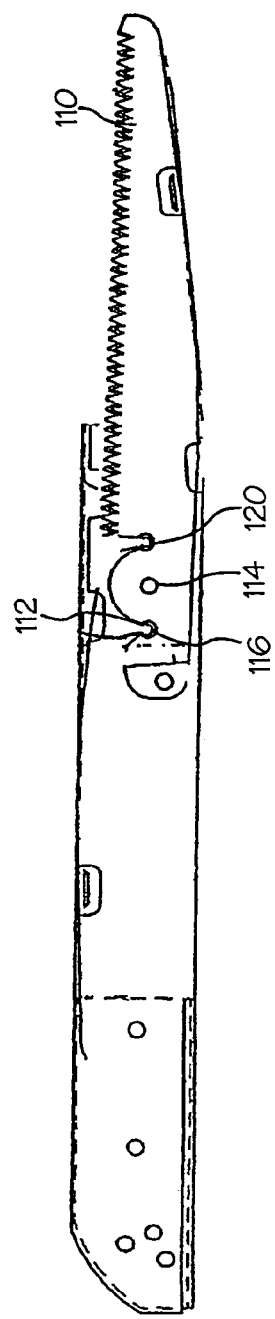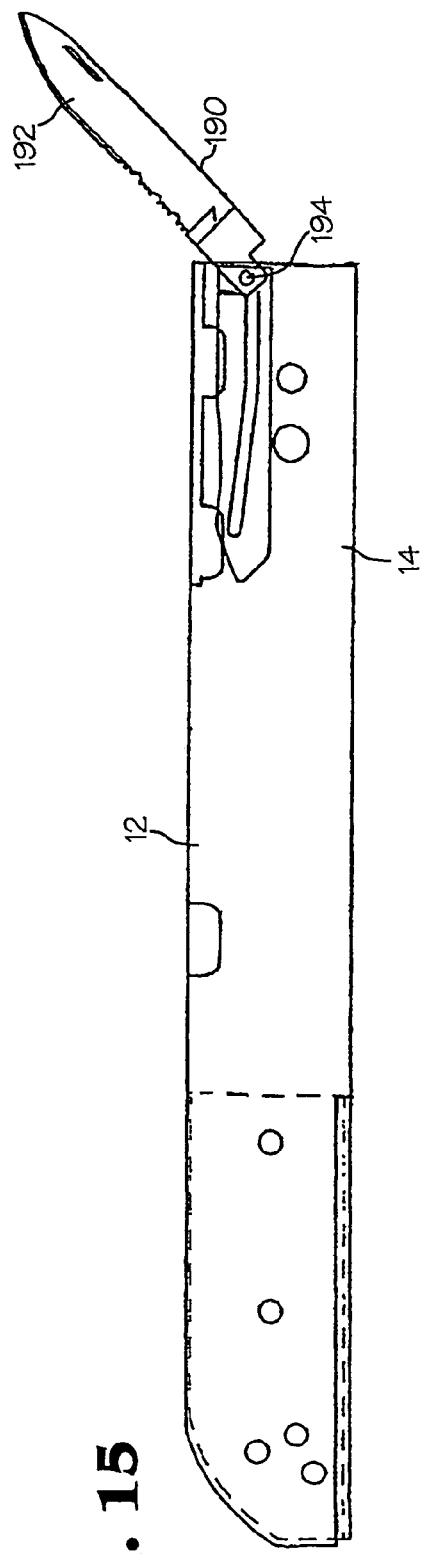

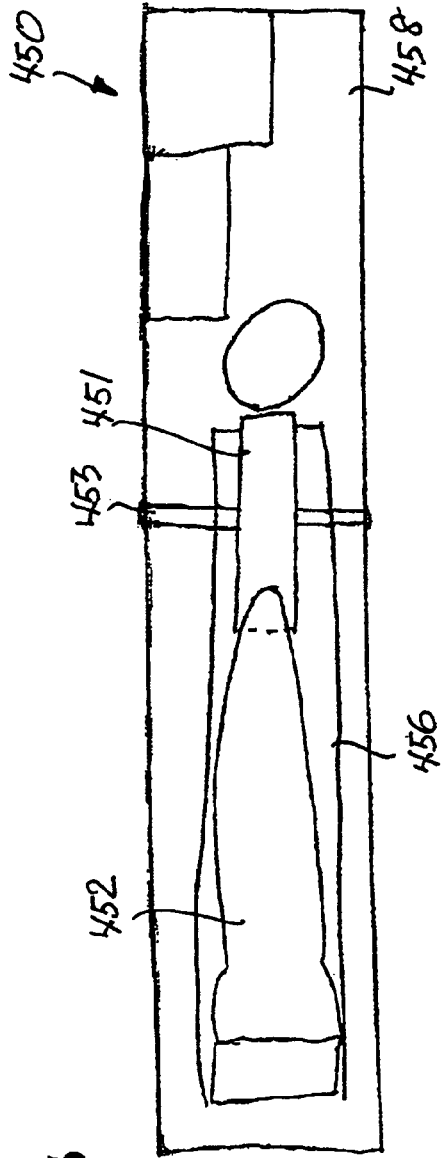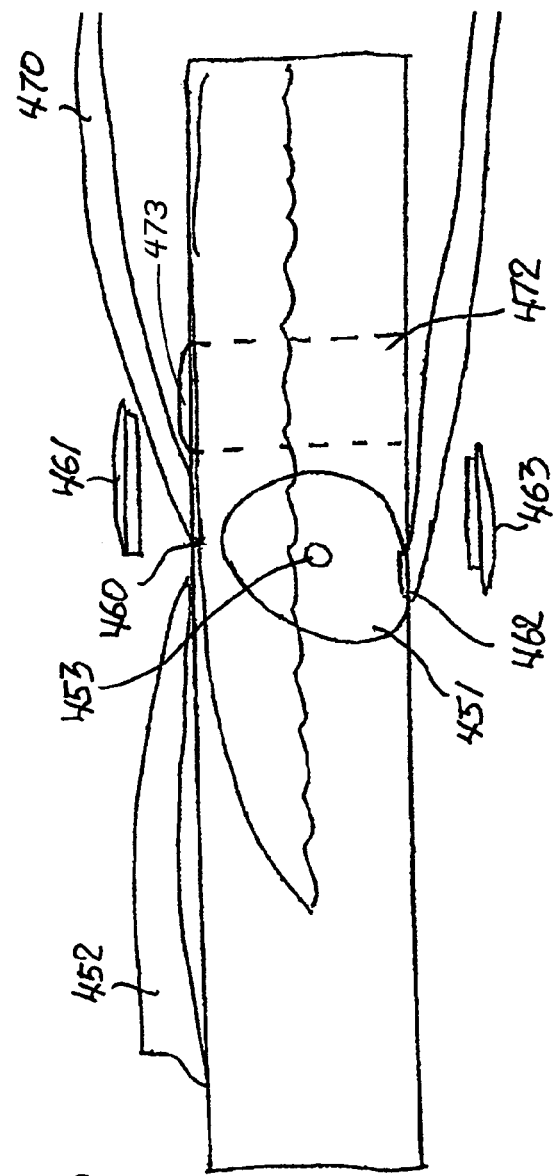
Fig. 25
Fig. 26

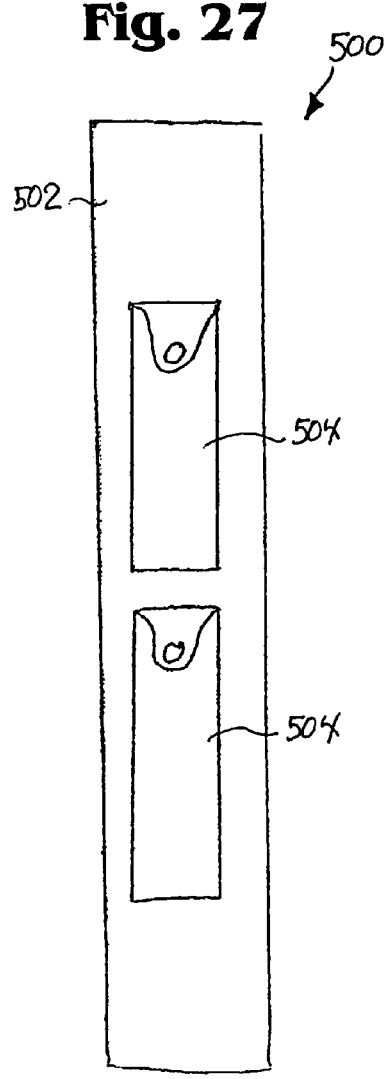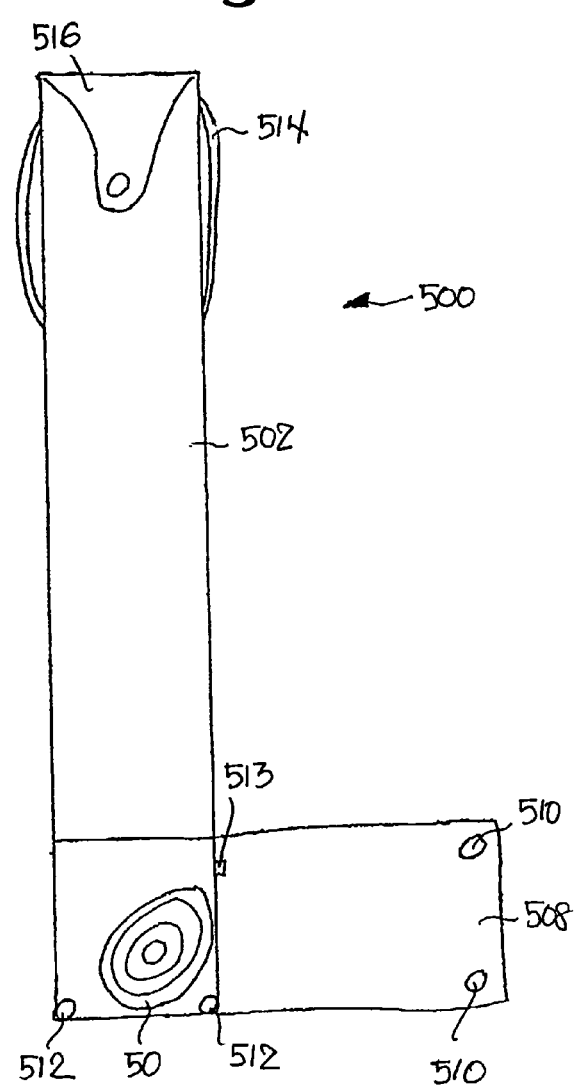

SINGLE BODY MULTI-TOOL DEVICE

CLAIM OF PRIORITY

This application makes reference to, incorporates the same herein, and claims all benefits accruing under 35 U.S.C. Sec. 119 from my provisional application SINGLE BODY MULTI-TOOL DEVICE filed with the United States Patent Office on Mar. 3, 2003 and thereby duly assigned Ser. No. 60/451,544.

BACKGROUND OF THE INVENTION

1. Field of the Invention

This application generally relates to a multiplicity of tools contained in a single body. This invention is generally in the field of hand tools, and is specifically concerned with hand tools used in the outdoors, such as while camping.

2. Related Art

Multipurpose tools configured by or into a single body tool utilizing a plurality of tool elements are generally known in the art as described by:

U.S. Pat. No. 4,023,221 to Russell O. Cadman for a MULTIPURPOSE TOOL KIT AND FOLDING HANDLE THEREFORE which describes a tool kit 20 including a plurality of pockets holding various tool components including a pick head, a shovel, a saw and an ax/hammer head;

U.S. Pat. No. 4,700,420 to John Belanger for a MULTI-PURPOSE CAMPING TOOL which describes a tool to be combinable, in various configurations, to form a pole ladder, an ax, a spade, a hoe, a grapple hook, a saw, a hammer, etc;

U.S. Pat. No. 5,103,520 to William L. Mazzo for a MULTI-PURPOSE HAND TOOL which describes a single body tool having various foldable elements useful as a hammer, pick, probe, ruler, knife, saw, spade, trowel and bottle opener; and U.S. Pat. No. 6,357,067 to Nathanael Whalen Jones for a MULTIPURPOSE SNOW/ICE TOOL FOR BACKCOUNTRY TRAVEL which describes a single body tool including a saw, shovel, ax, adze and pick.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 1 is a front side view of the device;

FIG. 2 is a rear side, view of the device;

FIG. 3 is a top view of the device showing the digging tool;

FIG. 13 is a cutaway side view of the saw in the closed position;

FIG. 14 is a side view of the saw in the open position;

FIG. 15 is a cut away side view of the pocket knife with one blade open; and

FIG. 25 is a top view of an alternate embodiment having a pulley system within the body;

FIG. 26 is a side view of the embodiment of FIG. 25;

FIG. 27 is a back view a carrying case for use with the disclosed device;

FIG. 28 is a front view of the carrying case of FIG. 27 open with the flashlight exposed.

DETAILED DESCRIPTION OF THE INVENTION

Figure 4:
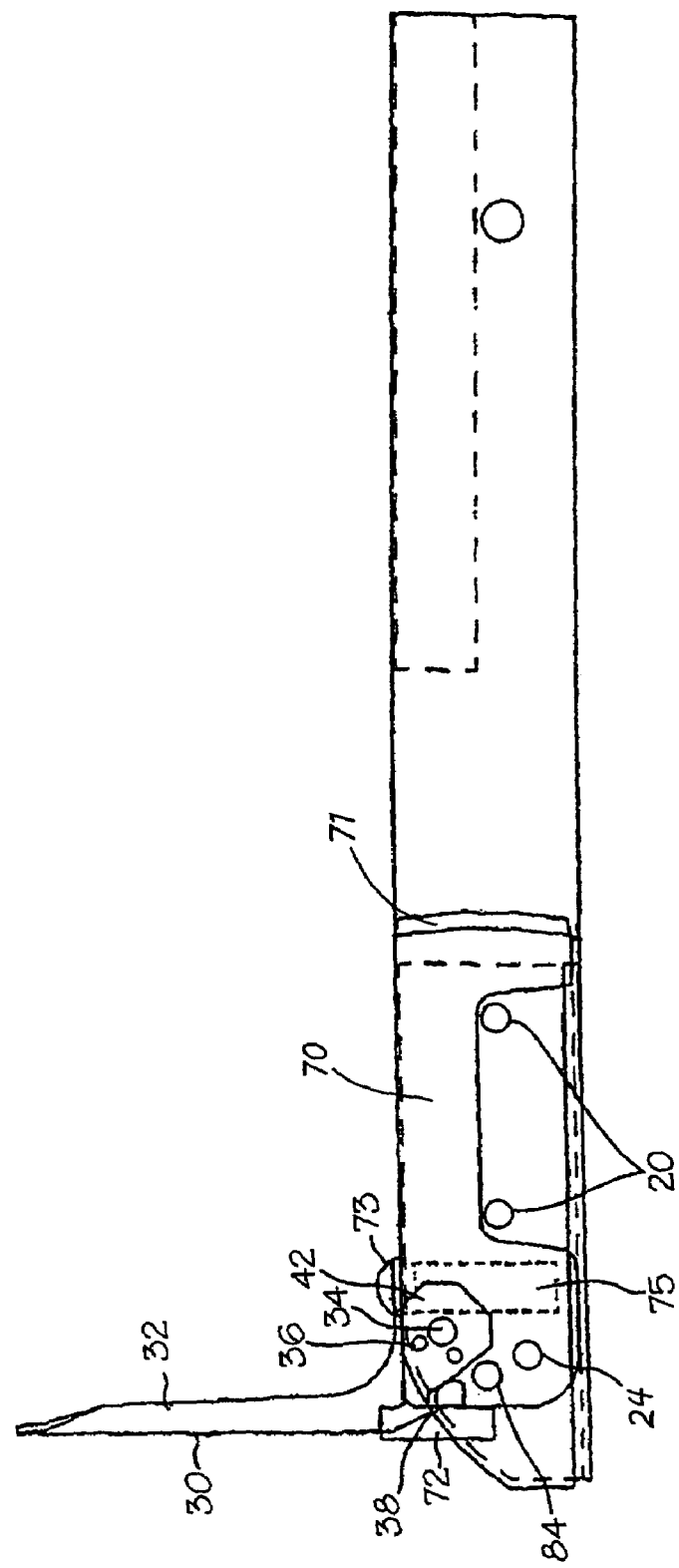
FIG. 4 is a cutaway front side view showing the digging tool and hatchet.

The disclosed device provides an method of carrying a number of tools or devices required for a particular purpose in a single body. The device illustrated hereinafter addresses many of the needs of someone hiking or camping. Other examples of alternate tools are noted hereinafter and it will be evident to those skilled in the art on which tools and accessories would be applicable for a specified end use.

A body 12 of the multi-tool device 10 is illustrated in the non-use, closed, position in FIGS. 1 and 2. The body 12 has an arced end 16 and a flat end 14 in the illustrated embodiments herein, however, it should be noted that although the drawings illustrate one end arced and the other flat; both ends can be either arced or flat.

In FIGS. 1 and 2, the device 10 is designed for use as a camping tool, although as disclosed hereinafter, other uses can be incorporated. A portion of a digging tool 30 can be seen extending beyond the periphery of the body 12. The digging tool 30 is partially recessed within the body 12 at the arced end 16.

Also extending beyond the periphery of the body 12 is a hammerhead 72 which is part of a hatchet (70 in FIG. 4) and described further below.

Figure 12:
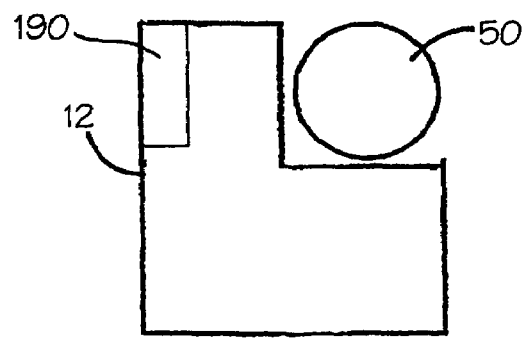
FIG. 12 is an end view of the body cut away to receive the flashlight head.

At the flat end 14 of the body 12, opposing the digging tool 30, is a flashlight 50 having a rotatable head 54. A power source 52 is recessed into the body 12 of the device 10 with the rotatable head 54 extending beyond the periphery of the body 12. The flashlight 50 can be recessed into any portion of the body 12 convenient for manufacture, an example of which is illustrated in FIG. 12, as long as the head 54 is free to rotate and there is no interference between the flashlight 50 and any other tool. Also shown, and described below, are a saw locking button 112, pins (rivets) 20, pin end 44, rotational pin 24 and locking buttons 76 and 78.

The flashlight 50 should be recessed from the edge of the tool to prevent the lens from accidentally breaking from impact to the end of the device. Additionally, it is preferred that the lens be a hardened plastic and the bulb one or more LEDs. Duel LEDs, such as one red and one white, can provide some advantages in some end uses as known in the art. In embodiments used for camping or hiking, it is preferable that at least one LED will flash. In some embodiments, the flashlight and LED can have blinking or flashing capabilities to enable the flashlight to act as a location strobe or signal a SOS, or rotating lenses to change the color of the light. A bulb/lens combination provides the strength and long life that would be most beneficial to the user. The lens of the flashlight is preferably removable, including the bulb, for easy replacement. A whistle (not shown) can be incorporated into the back of the flashlight or recessed into another area of the device.

The preferred placement of the flashlight is at the opposing end of the body 12 to the digging tool 30. In this way, the digging tool 30 avoids conflict with any of the other tools and can be fully extended and stuck into the ground, thereby permitting the flashlight head 54 to be rotated to focus upon a desired area. The digging tool 30 can also be used for defense against animals, cooking food, spearing fish, or other similar uses.

In this embodiment, a compass 218 is provided along one of the sides, although the preferred placement for structural integrity, especially when also providing a recessed area, is along the back or front. Ideally, the compass 218, when relying on outside illumination, is placed slightly spaced from the light, thereby enabling the light from the flashlight 50 to be reflected down to view the compass. The compass 218, either glow in the dark, standard, or with its own battery powered light, can be surrounded by an etchable plate for personalizing the device if desired. Also, the compass 218 can be hinged to permit the inclusion of another device, such as a mirror, atmosphere gauge, etc., to be recessed under the compass 218. Further, compass 218 can be a removable lid covering a storage compartment, thereby permitting the compass to used separate from the tool.

Other items can also be incorporated either on the surface, or recessed within the body, such as a thermometer, flint and striking bar, pressure gauge, fluorescent light, digital clock with alarm, etc. It should be noted that when the device incorporates magnetic materials, the compass will be affected and must therefore be removable from the body for accurate reading.

For example, instead of a compass 218, a clock can be used here. Additionally, such a clock can be incorporated in the same manner as the above described compass 218, either on the same side as compass 218 or on any other side of the tool.

Because the disclosed device will be used to create an action, such as to dig, saw, or chop, the exterior of the body must be comfortable to grip. One easy-to-hold embodiment is illustrated in FIG. 16A wherein the periphery of the body 12 is rounded. To keep the, weight at a minimum, plastic is one of the preferred materials for manufacture. Other materials would be a hard rubber, wood, composites, and various lightweight metals. Additionally, the body 12 can be coated with a gripping material to prevent slippage during use. For some uses, it can be preferable to use a material that permits color variety.

Figure 6:
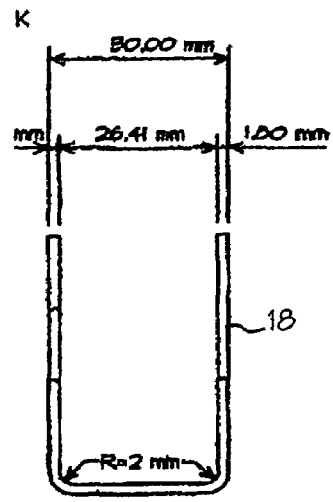
FIG. 6 is a end view of the structural frame.
Figure 8:
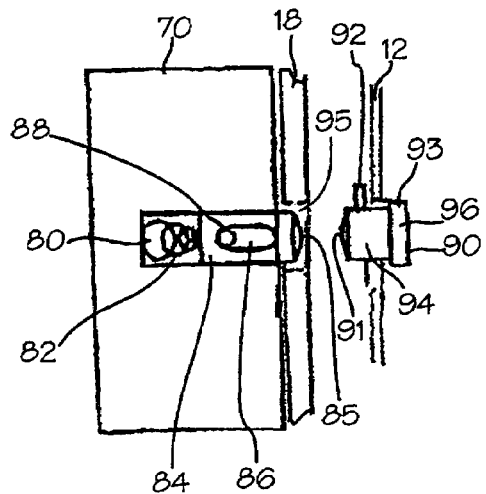
FIG. 8 is a cutaway side view of the hatchet release button and locking plunger.

As can be seen in FIG. 3, the digging tool 30 is centered and partially recessed within the depth D of the body 12. The digging tool 30 and the hatchet 70 are secured to a structural frame 18 (see FIG. 6) which is generally made of metal or other material of equivalent strength and rigidity. The structural frame 18 slides within, and is secured to, the body 12 through use of rivets, pins 20, button releases, such as illustrated in FIG. 8, or any other equivalent securing method. In this design the rivets and pivots maintaining the digging tool 30 and hatchet 70 in place within the structural frame 18 can be only through the structural frame 18 and not show on the outside of the body 12, or they can extend through the opposing sides of the body 12. It should be noted that in some embodiments the structural frame 18 is removable to permit the user to change tools. In these embodiments, the pins 20 would be replaced with screws. Also seen in this figure are a saw blade 110, a pocketknife 190, a digger blade 32 and flashlight 50.

The blade 32 of the digging tool 30, as seen in FIG. 4, rotates to the open position around a pivot pin 34, which bisects the digging tool body 42, and is secured to either side of the body 12 by pin ends 44, one of which is illustrated in FIG. 1. The back of the blade 32 is curved to fit around the hammer 72 as well as provide clearance for a cap 73 for a compartment 75. Compartment 75 can be a holder for matches or other items, such as a lighter (butane) removably mounted therein. When the holder for matches or other items is not incorporated or an alternate hammer head is used, the arc of the back of the digger blade 32 can be made shallower. Also seen in this figure are a blade 71 of hatchet 70 and a plunger 84 (described below). The blade 71, is arced to prevent the hatchet 70, when in the closed position, from conflicting with the holding pins 20 used to maintain the structural frame 18 within the body 12.

The digging tool 30 is prevented from over rotation by either the hammerhead 72 or the body of hatchet 70, depending the curve placed in the blade 32. When the digging tool 30 is to rest on the hammerhead 72, the blade 32 is cut similar to that illustrated in FIG. 3. However, when the hatchet 70 is used for the stop, the blade 32 can be cut much shallower. Whichever design is adopted, it is critical that, if the hammerhead is being used, the cut out be sufficient to permit the hammerhead 72 to clear the digging tool 30.

Figure 5:
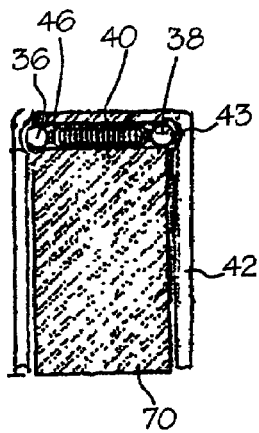
FIG. 5 is a cutaway view of the press pins for locking the digging tool.

The digging tool 30 is maintained in either the open or the closed position with bearings 36 and 38, which are illustrated in greater detail in FIG. 5 as described hereafter.

The bearings 36 and 38 are recessed within a channel 46 in the hatchet 70 in a manner to permit the bearings 36 and 38 to extend beyond the periphery of the body of the hatchet 70. The open ends of the channel 46 have a diameter less than the diameter of the bearings 36 and 38 in order to prevent the bearings 36 and 38 from falling out of the channel 46. The bearings 36 and 38 are separated by a spring 40 which forces the bearings 36 and 38 apart, maintaining a portion of the bearings 36 and 38 extend beyond the body of the hatchet 70. Receiving recesses 43 are placed within the digging tool body 42 to receive the bearings 36 and 38, thereby enabling the digging tool 30 to be locked in either a 90-degree angle from the body 12 or the closed position, parallel with the body 12. The strength required to move the digging tool 30 will be dependent upon the force applied by spring 40 and therefore the amount of pressure required to press the bearings 36 and 38 into the recesses 43.

As shown in FIG. 3, the length of the digging tool 30 blade 32 is slightly greater than that of the hatchet 70 to enable the digging tool 30 to serve as a means for rotating the hatchet 70 from it's recessed position within the body 12. If, for some reason, the blade 32 is shorter than, or equal to, the hatchet 70, other means for opening the hatchet 70 must be provided. Because of the interaction between the digging tool body 42 and the hatchet 70, the digging tool blade 32 can only be rotated 90 degrees from parallel to the body 12 without the hatchet 70 being released, enabling rotation around the rotational pin 74. Since, to avoid inadvertent rotation in either the closed or the open position, the hatchet 70 has locking buttons 76 and 78, the appropriate locking button 76 or 78 must be released prior to any movement.

The locking button 76 maintains the hatchet 70 in the closed position and any movement of the hatchet 70 is reliant upon release of the locking button 76. Upon rotation of the digging tool 30, the locking button 78 must be released to permit continued rotation of the digging tool 30 and opening of the hatchet 70 to 90 degrees. Once the hatchet 70 reaches the point of 90 degrees from the body 12, the locking button 78 is activated, locking the hatchet 70 in the 90 degree rotated position. The greater the distance between the locking buttons 76 and 78, the more impact that can be received by the device 12 without wear.

To prevent the hatchet 70, as well as any other tools disclosed herein, from having side-to-side movement, the dimensioning between parts is critical. To provide some allowances, rubber, or other semi-rigid material, can be used between the moving parts. The easiest method of accomplishing this is through the use of washers, however other methods can be used, such as rubber coatings on the tool.

Figure 24:
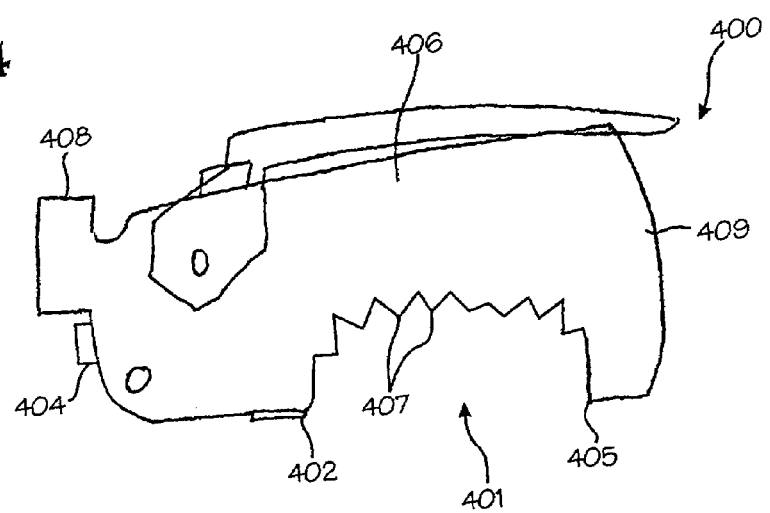
FIG. 24 is a side view of an alternate embodiment of the hatchet having rubber bumpers.

Alternatively, as illustrated in FIG. 24, rubber bumpers 402 and 404 are added to the hatchet/digging tool 400. In this embodiment bumper 402 is affixed to the underside of the body 406 and would contact the structural frame when the hatchet 400 is closed. The back bumper 404 is placed directly below the hammerhead 408 and contacts the structural frame when the hatchet/digging tool 400 is in the open position. Additional bumpers, of any material having the same qualities as rubber, can be placed in other locations on the hatchet body 406, or any other moving tool as described herein, which will be evident to those skilled in the art.

Also, as shown in FIG. 24, the body of the hatchet has a plurality of serrated teeth 407 disposed in a curved section 401 of the body of the hatchet, and a hook 405 formed at the junction of the curved section 401 and cutting edge 409. It should be quite apparent that each embodiment of the hatchet can include these teeth and this hook. The teeth and hook allow the tool to grapple a tree limb, for example, to hang the tool from the limb and use a pulley (described below with respect to FIGS. 25 and 26) to hoist items off the ground, for example.

The locking buttons 76 and 78, as illustrated herein in detail in FIG. 8, consist of two parts; the plunger 84 and the plunger head 90. A channel 80 is drilled into at least one side of the hatchet 70 slightly less than one half of the depth. A spring 82 is placed into the channel 80 with the plunger 84. Preferably, the spring 82 is a cone spring, or other spring that will compress tightly while providing sufficient resistance to the plunger 84.

The plunger 84 has a groove 86 cut into the surface that is dimensioned to permit a retaining pin 88 to slide freely within the groove 86. The retaining pin 88 is placed through a drilled hole from the top of the hatchet 70 to a depth that interacts with the groove 86. The retaining pin 88 is rigidly retained within the hatchet 70 and extending into channel 80, thereby permitting the plunger 84 to move only a regulated distance within the channel 80 and preventing inadvertent removal. An exposed end 85 of the plunger 84 has a rounded tip, as does an opposing end 91 of a locking pin body 94.

The plunger head 90 fits through a predrilled receiving hole 93 in the body 12 dimensioned to permit the button head 96 to be pressed inward to make the end 91 contact with the end 85 of the plunger 84. The plunger head 90 is prevented from falling through the receiving hole 93 by a retaining pin 92 which bisects the locking pin body 94 and is placed on the opposing side of the body 12. The end 91 of the locking pin body 94 is rounded, corresponding to the rounded end 85 of the plunger 84.

The rounded end 85 of plunger 84 extends into structural frame 18 to prevent the hatchet 70 from rotating. To prevent the locking pin body 94 from entering the channel 80, thereby preventing rotation, the channel 80 is dimensioned to permit only the plunger 84 to be recessed.

To open the hatchet 70, locking button 76 is activated by pressing plunger head 90 inward forcing plunger 84 to compress the spring 82, causing the rounded end 85 of plunger 84 to back out of locking hole 95. At this point, the hatchet 70 is free to rotate until the compressed plunger 84 is brought into proximity with another locking hole 95 in support frame 18 corresponding to and aligned with locking button 78.

Figure 11:
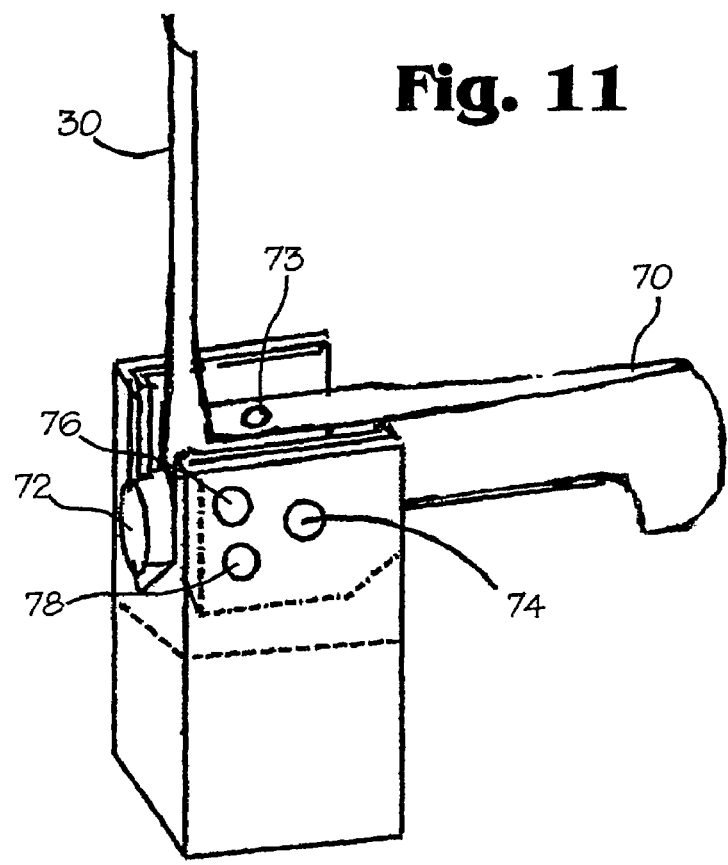
FIG. 11 is a perspective view of the digging tool and hatchet in the fully open position.

When hatchet 70 is rotated 90 degrees, compressed plunger 84 is brought into proximity with another locking hole 95 in support frame 18 corresponding to and aligned with locking button 78. At this time, spring 82 forces compressed plunger 84 into the locking hole 95 in support frame 18 aligned with locking button 78, locking the hatchet 70 in the 90 degree rotated position as shown in FIG. 11.

Figure 17:
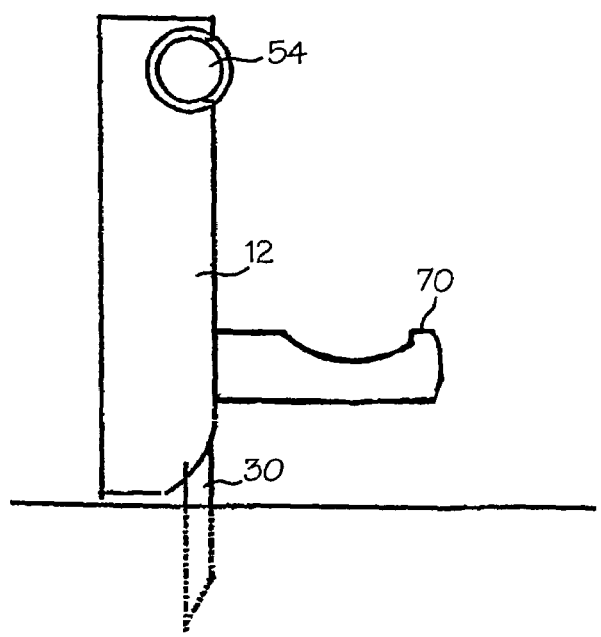
FIG. 17 is a side view of the device as placed in the ground.

Correspondingly, as illustrated in FIG. 17, the digging tool 30 is rotated about 180 degrees. Here, it is shown that this enables the digging tool 30 to be sunk into the ground, allowing the tool to stand upright for easy access.

Figure 7:
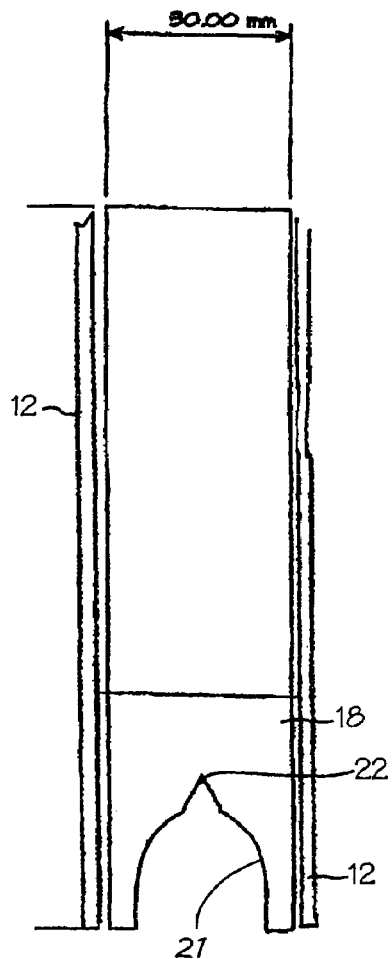
FIG. 7 is a back view of the structural frame.

In FIG. 7, the arced end 16 of the body 12 is cutaway to expose the structural frame 18 which has an opening 21, and in this embodiment, a cut out in the curved section to form a nail remover 22.

Alternatively, the opening 21 and nail remover 22 can be removed from the structural frame 18, leaving the structural frame rectangular, or other uses can be substituted, such as a receiving head for sockets. When the rectangular frame is used, it replaces the hammerhead described heretofore.

Figure 16:
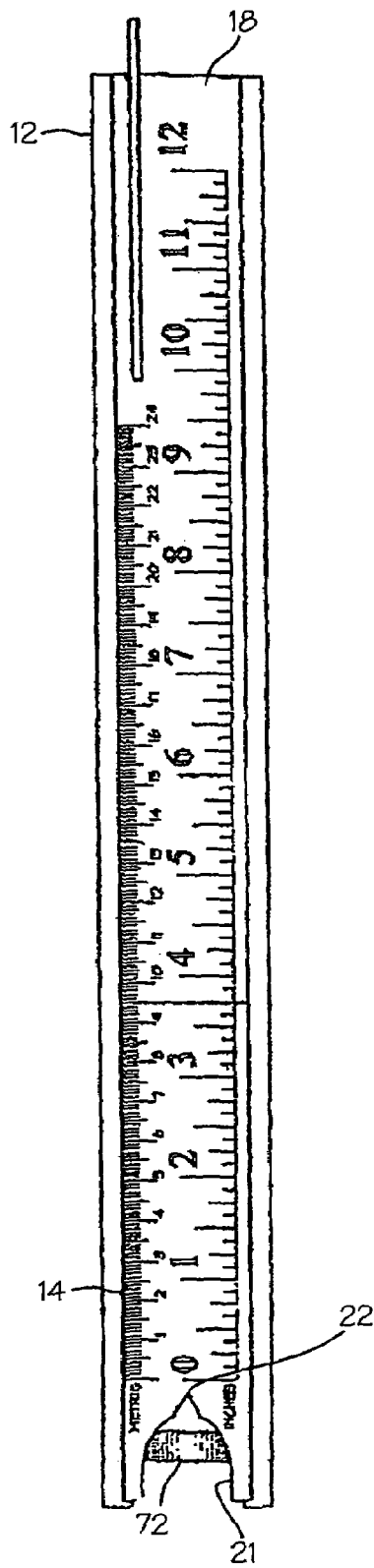
FIG. 16 is a front view of the bottom of the device.
Figure 16A:
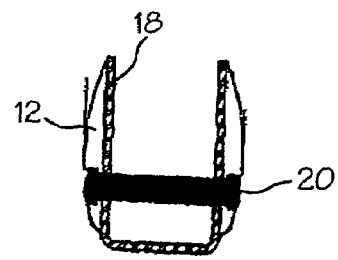
FIG. 16A is an end view of the curvature of the body.

As shown in FIG. 16, the bottom of the body 12 includes markings such as a ruler 14, although other indicators can be used depending upon the end use.

Figure 9A:
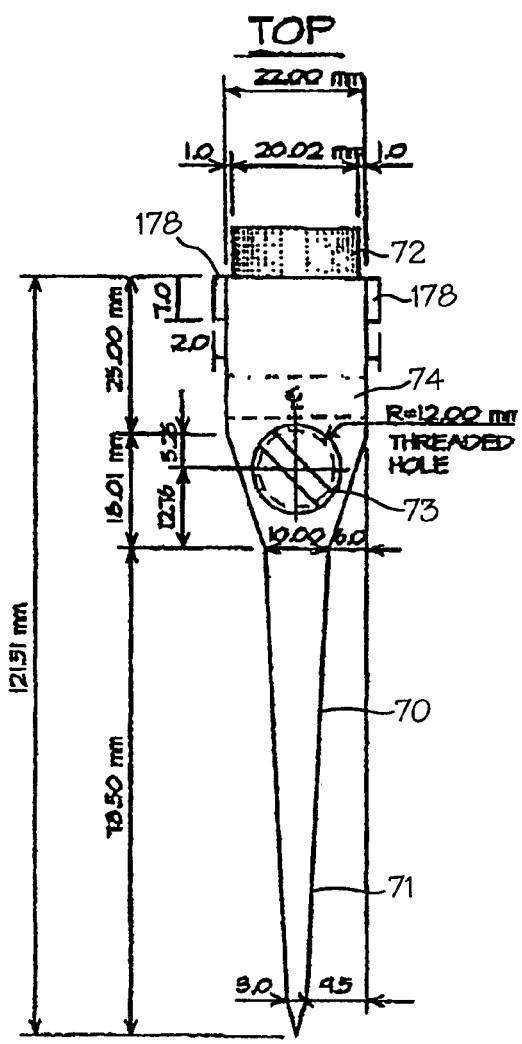
FIG. 9A is a top view of the hatchet and storage compartment.
Figure 10:
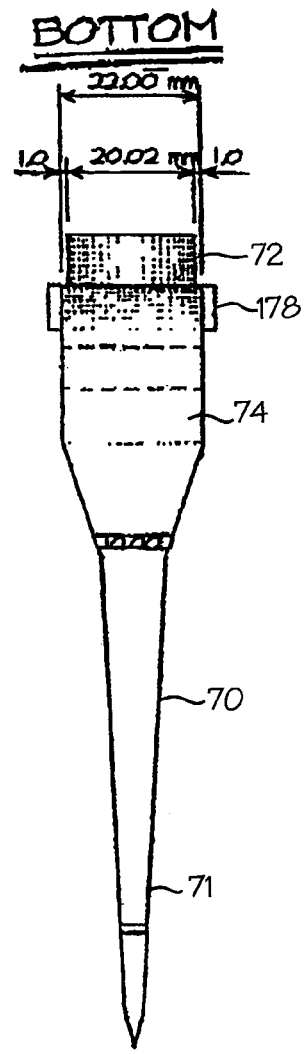
FIG. 10 is a bottom view of the hatchet.
Figure 9B:
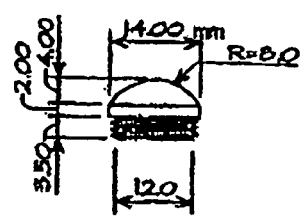
FIGS. 9B and 9C are alternative embodiments of a cap for the storage compartment of FIG. 9A.
Figure 9C:
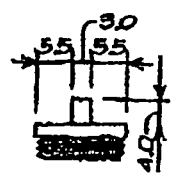

Referring to FIGS. 9A and 10, the top and bottom of the hatchet 70 are respectively illustrated to show the shape of the hatchet 70 as well as match cap 73 and hammer stops 178. The match cap 73 is preferably a waterproof material, such as plastic, that covers compartment 75, seen in FIG. 4, drilled into the hatchet body 74 to hold matches, a lighter, or other small items that should be kept dry. Match cap 73 can be threaded (see FIGS. 9B and 9C) to interact with matching threads in the compartment 75, with a opening notch as known in the art, or it can be a snap on/off cap that is either attached lose or attached to either the hatchet or part of a slip in vial dimensioned to fit within the hole. Other designs of caps and the attached thereof will be evident to those skilled in the art.

Figure 18:
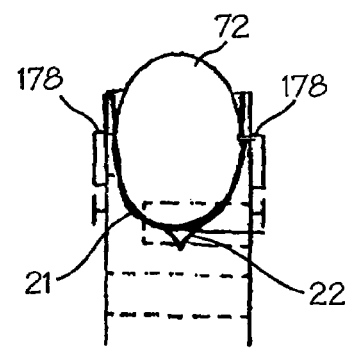
FIG. 18 is a top view of the hammer head.

To prevent the hatchet 70 from over rotating, stops 178 are provided on either side of the hammerhead 72 which interact with the structural support frame 18. As seen in FIG. 18, the stops 178 have a width greater than the width of the opening 21 of the structural frame 18. Thus, once rotated, in addition to the locking button 78 disclosed heretofore, the stops 178 serve to prevent over rotation. In order to prevent movement of the hatchet 70, the locking button 78 should be positioned to lock as the stops 178 come in contact with the structural support frame 18.

The hatchet 70 has an arced blade 71 extending from one side of the hatchet body 74 to a hammerhead 72 at the opposing side. The blade 71, as seen in FIG. 4, is arced to prevent the hatchet 70, when in the closed position, from conflicting with the holding pins 20 used to maintain the structural frame 18 within the body 12.

The device 10 also includes a pocketknife 190, illustrated in FIG. 15, that is recessed in the flat end 14. The pocketknife can be a standard multi-blade knife or any specialized knife, including a specifically designed removable knife for use with the disclosed invention. In some embodiments to eliminate the bulk of the normal or custom pocketknife body, the knife 190 is constructed as a part of the body 12. In these embodiments, the body 12 would be designed with a channel in which the blade(s) would be retained, the knife blade 192 would then rotate around pivot pin 194, which would extend through the body 12. In order to avoid conflict with other devices, the knife 190 is recessed within the body 12 on the opposite corner edge from the flashlight 50, as shown in FIG. 12.

The locking mechanism for the knife blade in any of the embodiments can be a standard spring arm mechanism as known in the art. Other locking mechanisms used for knives, such as release buttons on the bottom, spring releases., etc. can be used as will be evident to those skilled in the art. The use of a removable knife, whether it is a custom designed exterior specifically for use with the disclosed invention, or a standard pocket knife, provides the advantage of providing the user with the ability to change the type of knives being carried. In embodiments where a customized knife body is incorporated, various collections of related knives can be sold together as a unit design for a particular purpose, such as hunting, fishing, diving, etc.

The body 12 further contains a hand saw 110, illustrated in FIGS. 13 and 14, that is recessed with the body on the opposing wall from flashlight 50, adjacent to the knife 190. In embodiments where the knife 190 rotates within the body 12, the same bolt can be used to secure both the saw 110 and the knife 190. The positioning of the saw 110 within the body 12 can be clearly seen in FIG. 3.

The body 12 contains a pivot recess 118 that provides an open channel for the saw 110 end to rotate. The saw 110 rotates around a pivot pin 114 and locks in position through use of locking button 112 and locking holes 116 and 120.

When in the closed or recessed position, as seen in FIG. 13, locking hole 120 is engaged with the locking button 112. Once rotated to the open position, as seen in FIG. 14, the locking hole 116 is engaged with the locking button 112.

The locking holes 120 and 116 have an entrance port 218 which is only a portion of the circumference of the locking interior 216. The locking button 112 preferably locks the saw 110 in place through the use of spring loaded release buttons, although friction fit, a flat steel spring or other alternative designs can be incorporated.

Figure 20:
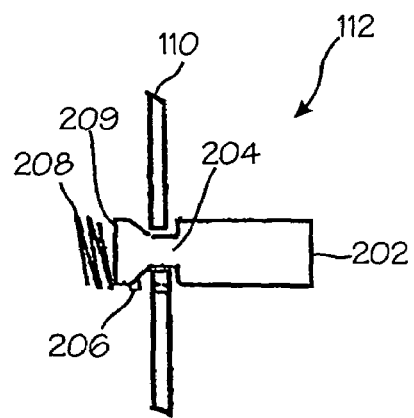
FIG. 20 is a side view of the beveled plunger button.

As shown in FIG. 20, the locking button 112 has a body 202 that extends through the device body 12 (not shown) a sufficient amount to allow for the needed movement of the locking button 112. The neck 204 of the locking button 112 is dimensioned to pass through the entrance port 218, thereby enabling the locking holes 120 and 116 to rotate on to and off of the neck 204.

The locking button 112 further has an angled edge 206 which leads to the spring contact 209. The spring 208 and the spring contact 209 are retained within a recess within either the body or the structural unit of the device 10. At rest, the pressure from the spring 208 forces the angled edge 206 to contact and apply pressure to the locking interior 216, thereby preventing movement. When the body 202 is pressed, the locking button 112 moves to place the neck 204 in proximity to the entrance port 218, enabling the locking hole 120 or 116 to rotate off the neck 204.

The locking pin 112 is one method of maintaining the saw blade 110 in place and other methods, such as friction fit or the plunger as disclosed heretofore, can also be incorporated and will be evident to those skilled in the art.

The saw blade 110, illustrated in FIG. 13, extends beyond the flat end of the body 12 to provide a hanger 122 and opening handle, however this can be eliminated and the blade shortened. In some embodiments, where a smaller saw is used, the external slot for the pivot recess 118 can be eliminated and the pivoting accomplished within the body. Additionally, when the blade is shortened, alternative means must be provided to open the blade, such as a notch 113 in body 12 and a corresponding groove 115 in blade 110.

Figure 19:
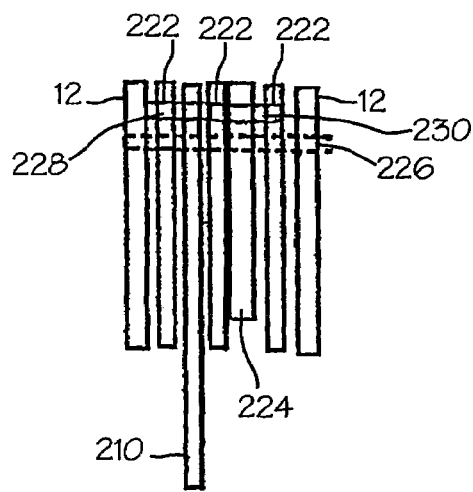
FIG. 19 is an exploded view of the knife and saw within the structural support.

As the saw and the knife are proximate to one another, a single, either stationary or removable, unit can be designed to hold both the saw and the knife. This is illustrated in FIG. 19, wherein a W shaped metal frame 222 is used to retain a saw 210 and a knife 224. The metal frame 222 is maintained within the body 12 through the use of pins 226 which are designed to not interfere with the knife 224 and saw 210. The saw 210 rotates on pivot 228 and the knife rotates on pivot 230, both of which are secured to the metal frame 222. In one embodiment, the pins 226 are permanently secured to the body 12, while in another embodiment the pins 226 are replaced with screws or other securing device or method, such as the plunger disclosed heretofore, to enable the unit to be removed. This enables the user to have various units that can be interchangeably placed into the same body.

Figure 21:
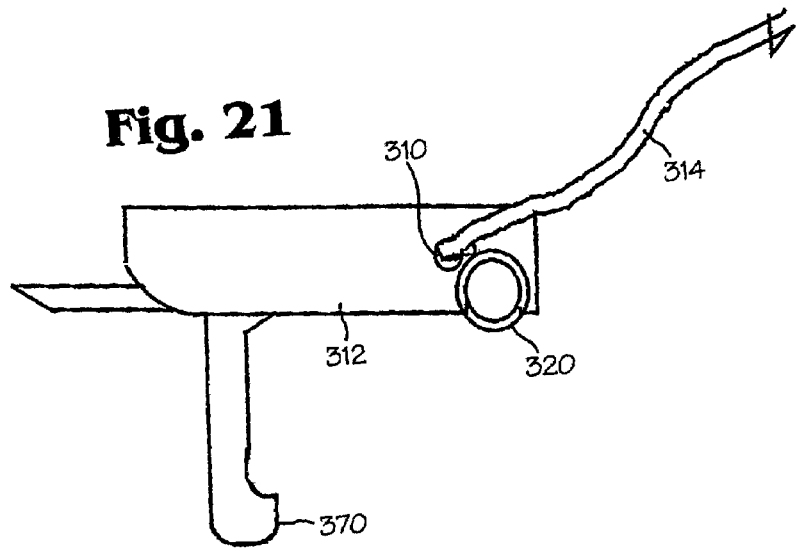
FIG. 21 is a side view of an alternate embodiment to the invention.

In the embodiment of FIG. 21, a hole 310 has been added in a body 312, positioned to enable a hatchet 370 to close while still being within the structural support. Although the hole can be further down on the body, placing the hole away from the structural support eliminates the advantage of having the added strength provided by the structural support. Alternatively, the structural support can be lengthen to enable the hole to be more centered.

A rope 314 has been passed through the hole 310 to enable the hatched 370 to be used as a hanger, grappling hook, etc. It should be noted that although a rope 314 is illustrated herein, a wire, rod, etc., can also be placed through the hole. In the preferred embodiment, the hole 310 has caps 320 (only one shown) which can hold additional items, such as light lenses, or other small items. The head of the cap can be a watch face, compass, barometer, mirror, etc.

Figure 22:
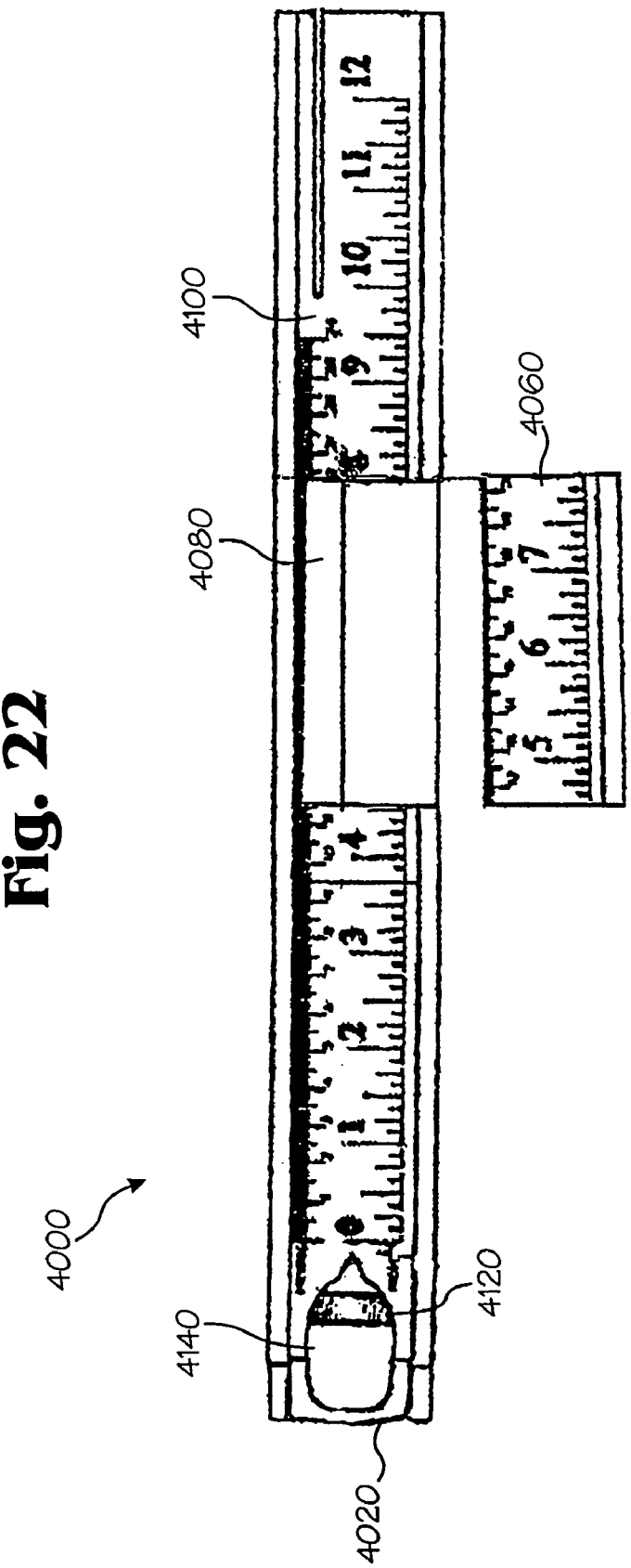
FIG. 22 illustrates an alternate embodiment of the device having an additional compartment and an additional brace.

In FIG. 22 an alternate device 4000 is disclosed which provides an additional compartment 4080 along the back of the device 4000. In this embodiment, the compartment 4080 is covered by a slide lid 4060 which slides either completely off or to a predetermined point. The means for sliding lids are well known in the art and any applicable method can be incorporated herein. The lid can also be hinged, snapped in, rotate, or any other applicable method. In this embodiment, a ruler 4100 has been applied to the back of the device 4000. When other indicators are used on the back of the device, the lids and compartments can be any configuration applicable to the end use. The compartment 4080 is convenient for carrying small tools, such as a leatherman, cash, jewelry or other small items.

The device 4000 also has a brace bar 4020 as part of structural frame support 4120. The brace bar 4020 serves as an ideal hanger as well as providing additional structural support for the device. The brace bar 4020 further enables the user to slide his/her belt through opening 4140 to carry the device, thereby eliminating the need for a carrying case. It is critical that the interior of opening 4140 be dimensioned to receive the head of the hammer without binding.

Figure 23:
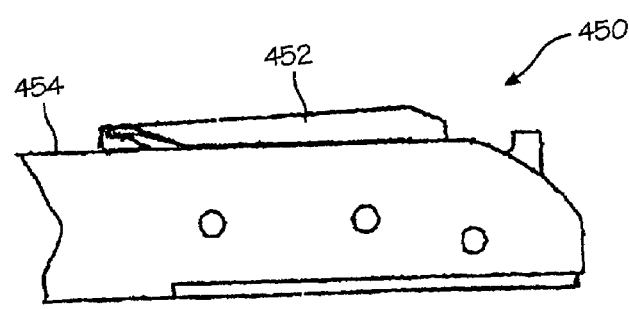
FIG. 23 illustrates an additional embodiment having a protector proximate the end of the digging tool.

In FIG. 23, a device 450 uses a protective shield 454 that is placed at the end of digging tool 452. The protective shield 454 serves to keep the user's hand from hitting the end of the digging tool 452.

FIGS. 25 and 26 a pulley 451 has been placed within body 458 of device 450. The pulley 451 is placed so that at least the center is within structural frame support 456 to enable holding pin/axle 453 to be attached to, or pass through, the structural frame support 456. This provides the greatest strength for pulley 451. Openings 460 and 462 are positioned within the body 458 and structural frame 456 to permit a rope 470 to be passed through the opening 460, around the pulley 451 and out the opening 462. The holding pin/axle 453 can extend all the way through the body 458, or can be only secured to the structural support 456. The positioning of the pulley 451 within the body 458 must be such that it does not interfere with the other devices, such as a compartment 472. Also shown are caps 461, 463 and 473 for openings 460, 462 and compartment 472, respectively.

When the removable units are incorporated, replacement units can be provided to replace the hatchet/digging tool unit or saw/knife unit. These can include a fish filet blade, a vise grip, scissors, a file, a lug nut wrench, an adjustable wrench, a sharpening stone, a socket set, a hack saw blade, a can/bottle opener, a magnifying glass, a signal mirror, a thermometer, utensils for cooking over a fire, a screw driver, a hex adapter, multiple knife or saw blades, etc.

Additionally, a shovel can be placed within a structural support and the device can be used to form the shovel handle. When the end use dictates the addition of matches, the striker can be located any convenient place on the body, since there is no substantial "depth" required by the striker, there is no concern about weakening the body. Although reference is made heretofore to a compass, it should be noted that other appropriately sized devices can be substituted, such as an alarm watch, radio or other battery powered electronic device, barometer, depth gauge, etc., and that these devices can be placed in locations other than indicated as long as they do not jeopardize the structural integrity or functioning of the device. For battery powered items, placement can be proximate the flashlight batteries to enable the two items to use the same battery source. To compensate for the drain of two devices pulling power, or to provide additional power to a single device, rechargeable batteries can be used and a solar panel incorporated on the exterior of the body.

Preferably, a case is provided for the device 10 which, in addition to the pocket for the disclosed device, has additional storage for items like a leatherman, etc.. As illustrated in FIGS. 27 and 28, a case 500, which is practical for hiking, camping, etc., includes an elongated body 502 preferably having one or more compartments (pockets) 504 to hold smaller tools, money, etc. The compartments 504 can either be open, or secured through any means known in the art such as zipper, Velcro®, snaps, button, etc.

Although FIG. 27 illustrates the placement of compartments 504 on one side (back) of body 502, the compartments 504 can be placed on one or more surfaces of body 502.

In FIG. 28, the front of the case 500 is illustrated wherein the bottom of the body 502 has a closure flap 508 which opens to expose the flashlight 50. The flap 508 has securing elements 510 which interact with securing elements (not shown) on the case body 502 to either maintain the flap 508 open or closed.

In the preferred embodiment a switch 513 is provided that automatically turns the flashlight 50 on when open and off when closed. To accomplish this, the flashlight 50 must have a pressure sensor or other device that reacts to switch 513. Alternatively the flashlight 50, as described heretofore, can be turned on manually prior to placement into the case body 502.

To keep the case 500 from bouncing and to ensure that the flashlight is pointed in the correct direction, eyelets 512 are provided to enable the case 500 to be tied around the user's leg, or to a tree or other structure. When being carried by a user, a belt loop 514 is used, although this is only one method of maintaining the device on the users belt. Other methods, such as the snap locks, popular for cell phones, can also be used. The snap lock can be either on the case or alternatively directly mounted on the multi tool device. Preferably the case body 502 has a closure 516 that prevents the device 10 from sliding out of the case 500. This closure can be a flap, secured by any means known in the art, such as a snap, zipper, etc.

The invention has been described with particular embodiments thereof, however, indicated by the foregoing, various changes and modifications can be made therein without departure from the scope of the appended claims.

What is claimed is:

1. A multi-tool device comprising:
   a single housing, said housing comprising a plurality of compartments;
   a hatchet having a body including a cutting edge on one end, said hatchet being rotatably mounted in a first one of said compartments of said housing at a first end of said housing; and
   a digging tool rotatably mounted on the body of said hatchet, said digging tool attached to said housing, said digging tool overlaying said first one of said compartments when said digging tool is in a closed position.

2. The multi-tool device as set forth in claim 1, further comprising:
   a first locking device and a second locking device, each being disposed at said first end of said housing, said first locking device locking said hatchet in a closed position in said first one of said compartments, and when pressed by a user, releasing said hatchet to allow said user to rotate said hatchet and rotatably extract said cutting edge from said first one of said compartments, said second locking device locking said hatchet in an open position when said hatchet is rotated 90 degrees.

3. The multi-tool device as set forth in claim 2, wherein said first locking device comprises a plunger and a plunger head, said plunger being disposed in the body of said hatchet and said plunger head being disposed in said housing.

4. The multi-tool device as set forth in claim 1,
   with said digging tool being limited to a 90 degree rotation with respect to the body of said hatchet by the body of said hatchet.

5. The multi-tool device as set forth in claim 1, further comprising:
   a knife disposed in a third one of said compartments of said housing.

6. The multi-tool device as set forth in claim 5, further comprising:
   a saw disposed in a fourth one of said compartments of said housing at said second end of said housing and adjacent to said knife.

7. The multi-tool device as set forth in claim 1, further comprising:
a saw disposed in a third one of said compartments of said housing.

8. The multi-tool device as set forth in claim 1, further comprising:
a compass disposed in a third one of said compartments of said housing at a position between said first and second ends of said housing.

9. A multi-tool device as set forth in claim 8, with said compass outwardly disposed in said third one of said compartments for light to be reflected to view said compass.

10. The multi-tool device as set forth in claim 8, said third one of said compartments being a storage compartment.

11. A multi-tool device as set forth in claim 10, wherein said compass forms a lid for said storage compartment.

12. A multi-tool device as set forth in claim 1, with said body of said hatchet including a hammer head on a distal end from said cutting edge.

13. The multi-tool device as set forth in claim 12, with said digging tool being limited to a 90 degree rotation with respect to the body of said hatchet by said hammer head.

14. The multi-tool device as set forth in claim 1, said housing further comprising:
a structural support frame to which said hatchet is rotatably mounted, said structural support frame adding structural strength to said housing.

15. The multi-tool device as set forth in claim 1, further comprising a storage compartment in the body of said hatchet.

16. The multi-tool device as set forth in claim 1, the body of said hatchet comprising a plurality of serrated teeth and a hooked portion for enabling said hatchet to be hooked over and grapple a tree limb for hanging said multi-tool device from said tree limb.

17. The multi-tool device as set forth in claim 16, further comprising:
a pulley rotatably mounted at a position between said first and second ends of said housing for hoisting items when said hatchet is grappled to said tree limb.

18. The multi-tool device as set forth in claim 1, with said digging tool being rotatably attached to said housing through a pivot pin, said pivot pin being secured to said housing.

19. A multi-tool device as set forth in claim 1, comprising a flashlight disposed in a second one of said compartments of said housing.

20. The multi-tool device as set forth in claim 19, said flashlight having a rotatable head and interchangeable lens.

21. The multi-tool device as set forth in claim 19, wherein said flashlight is recessed into said housing from an edge of said second one of said compartments of said housing.

22. A multi-tool device as set forth in claim 19, with said flashlight being removably disposed in said second one of said compartments of said housing.

23. A multi-tool device as set forth in claim 1, further comprising a whistle incorporated into said housing.

24. The multi-tool device as set forth in claim 1, wherein said digging tool is maintained in either an open or a closed position with bearings, said bearings being recessed in the body of said hatchet in a manner to permit said bearings to extend beyond the periphery of the body of said hatchet.

25. The multi-tool device as set forth in claim 1, wherein a length of said blade of digging tool is at least a length of the body of said hatchet.

26. A multi-tool device comprising:
a single housing, said housing comprising an elongated body having a plurality of compartments;
at least one cutting tool removably mounted in a first one of said compartments of said housing; and
at least one second one of said compartments of said housing to hold a flashlight.

27. The multi-tool device as set forth in claim 26, further comprising:
a structural support frame disposed within the elongated body of said housing and adding structural strength to said housing;
a hatchet having a body including cutting edge on one end and a hammer head on a distal end, said hatchet being rotatably mounted to said structural support frame about a pivot point, said hatchet being disposed in a third one of said compartments; and
a digging tool rotatably mounted on the body of said hatchet, said digging tool overlaying said third one of said compartments.

28. The multi-tool device as set forth in claim 27, further comprising:
a first locking device and a second locking device, each being disposed at said first end of said housing, said first locking device locking said hatchet in a closed position in said first one of said compartments, and when pressed by a user, releasing said hatchet to allow said user to rotate said hatchet and rotatably extract said cutting from said first one of said compartments, said second locking device locking said hatchet in an open position when said hatchet is rotated 90 degrees.

29. A multi-tool device as set forth in claim 26, further comprising a flashlight being disposed in said second one of said compartments of said housing.

30. A multi-tool device comprising:
a single housing, said housing comprising an elongated body having a plurality of compartments;
a hatchet having a body including a cutting edge on one end, said hatchet being rotatably mounted to said housing about a pivot point, said hatchet being disposed in a first one of said compartments of said housing at a first end of said housing;
a digging tool rotatably mounted on the body of said hatchet, said digging tool attached to said housing, said digging tool overlaying said first one of said compartments; and
a cutting tool removably mounted in a second one of said compartments of said housing.

31. The multi-tool device as set forth in claim 30, further comprising:
a flashlight disposed in a third one of said compartments of said housing.

* * * * *